United States Patent
Mody et al.

(10) Patent No.: US 12,481,416 B2
(45) Date of Patent: Nov. 25, 2025

(54) PROGRESSIVE REFRESH OF USER INTERFACE SCREENS

(71) Applicant: ServiceNow, Inc., Santa Clara, CA (US)

(72) Inventors: Yamit Mody, Santa Clara, CA (US); Hon-Sum Matthew Ng, Santa Clara, CA (US); Damia Ferrer Biosca, Santa Clara, CA (US); Adam Golab, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 890 days.

(21) Appl. No.: 17/590,792

(22) Filed: Feb. 1, 2022

(65) Prior Publication Data

US 2023/0244361 A1    Aug. 3, 2023

(51) Int. Cl.
*G06F 3/0484* (2022.01)
*G06F 3/0482* (2013.01)
*G06F 3/0483* (2013.01)
*G06F 9/451* (2018.01)

(52) U.S. Cl.
CPC .......... *G06F 3/0484* (2013.01); *G06F 3/0482* (2013.01); *G06F 3/0483* (2013.01); *G06F 9/451* (2018.02)

(58) Field of Classification Search
CPC .... G06F 3/0484; G06F 3/0482; G06F 3/0483; G06F 9/451
See application file for complete search history.

(56) References Cited

U.S. PATENT DOCUMENTS

| | | | |
|---|---|---|---|
| 4,941,084 | A | 7/1990 | Terada et al. |
| 5,185,860 | A | 2/1993 | Wu |
| 5,237,518 | A | 8/1993 | Sztipanovits et al. |
| 5,261,097 | A | 11/1993 | Saxon |
| 5,265,252 | A | 11/1993 | Rawson, III et al. |
| 5,367,685 | A | 11/1994 | Gosling |

(Continued)

FOREIGN PATENT DOCUMENTS

| | | |
|---|---|---|
| EP | 0433979 | 6/1991 |
| EP | 1607824 | 12/2005 |

(Continued)

OTHER PUBLICATIONS

International Search Report and Written Opinion for PCT/US2022/081500, mailed Apr. 19, 2023.

*Primary Examiner* — Daniel Samwel
(74) *Attorney, Agent, or Firm* — McDonnell Boehnen Hulbert & Berghoff LLP

(57) ABSTRACT

An embodiment may include determining user interface (UI) screens of an application that have been navigated to by way of a UI of the application. The embodiment may also include receiving an interaction with a UI component of a current UI screen of the UI screens and, based on receiving the interaction, determining a next UI screen of the UI screens that is expected to be revisited after the current UI screen. The embodiment may additionally include, prior to receiving a request to navigate to the next UI screen, transmitting, to a server device, a query for an updated version of the next UI screen, receiving, from the server device, a response including the updated version of the next UI screen, and, based on receiving the request to navigate to the next UI screen, displaying, based on the response, the updated version of the next UI screen.

20 Claims, 11 Drawing Sheets

(56) References Cited

U.S. PATENT DOCUMENTS

| | | |
|---|---|---|
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 9,385,914 B1 | 7/2016 | Britto et al. |
| 10,673,963 B1 | 6/2020 | Feiguine et al. |
| 10,749,943 B1 | 8/2020 | Feiguine et al. |
| 10,771,344 B2 | 9/2020 | Bitterfeld et al. |
| 10,824,650 B2 | 11/2020 | Bar Oz et al. |
| 10,944,654 B2 | 3/2021 | Rimar et al. |
| 11,089,115 B2 | 8/2021 | Garty et al. |
| 11,095,506 B1 | 8/2021 | Erblat et al. |
| 2002/0056096 A1* | 5/2002 | Mori .................. H04N 21/858 725/38 |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0184613 A1 | 8/2006 | Stienessen et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0198787 A1* | 8/2009 | Broda ................. G06F 16/9577 709/209 |
| 2009/0228984 A1 | 9/2009 | Sterin |
| 2009/0300642 A1* | 12/2009 | Thaler .................. G06F 3/0611 718/105 |
| 2010/0110932 A1 | 5/2010 | Doran et al. |
| 2011/0029641 A1* | 2/2011 | Fainberg ................. H04L 67/02 709/224 |
| 2011/0125755 A1* | 5/2011 | Kaila ...................... G06F 16/54 707/E17.09 |
| 2012/0151336 A1* | 6/2012 | Scherpa .................. H04N 7/15 715/273 |
| 2013/0104114 A1 | 4/2013 | Reiss et al. |
| 2014/0380144 A1* | 12/2014 | Liang ................... G06F 40/166 715/234 |
| 2018/0123940 A1 | 5/2018 | Rimar et al. |
| 2018/0143747 A1* | 5/2018 | Sakai ........................ G09G 5/00 |
| 2018/0183891 A1* | 6/2018 | Zhang .................... H04L 67/125 |
| 2019/0104398 A1 | 4/2019 | Owen et al. |
| 2020/0050689 A1 | 2/2020 | Tal et al. |
| 2020/0142714 A1* | 5/2020 | Navarro .............. G06F 9/44526 |
| 2020/0204443 A1 | 6/2020 | Bar Oz et al. |
| 2021/0194764 A1 | 6/2021 | Badyan et al. |
| 2021/0240318 A1 | 8/2021 | Schoppe et al. |
| 2021/0365491 A1 | 11/2021 | Nandi et al. |

FOREIGN PATENT DOCUMENTS

| | | |
|---|---|---|
| JP | 2011059226 A | 3/2011 |
| JP | 2020074154 A | 5/2020 |
| WO | WO 99/34285 | 7/1999 |
| WO | WO 00/52559 | 9/2000 |
| WO | WO 01/79970 | 10/2001 |
| WO | 2016185551 A1 | 11/2016 |

\* cited by examiner

PROGRESSIVE REFRESH OF USER INTERFACE SCREENS

BACKGROUND

A software application may be configured to cache at least part of a response received from a server device. Such caching may improve an apparent responsiveness of the software application to user navigation requests, since at least part of a given user request might be satisfied based on the cached data. However, the cached data might become stale over time, and displaying such data might thus be undesirable. Accordingly, it is beneficial to detect and/or update stale cache contents.

SUMMARY

A software application may be configured to operate by displaying a plurality of user interfaces (UIs). In some cases, these UIs may be arranged into UI screens, each of which may include one or more UI components, and/or may be grouped into tabs, each of which may include one or more related UI screens. The UI screens may be generated on behalf of the software application by a server device. The server device may also maintain the underlying data based on which the UI screens are generated and/or that is displayed by way of the UI screens. The software application may be a native application and/or a web browser based application.

In order to improve a responsiveness of the software application to user inputs, the software application may be configured to cache UI screens that have previously been navigated to and/or displayed by way of the software application (e.g., as part of a given usage session). Thus, requests to revisit previously viewed UI screens may be satisfied using the cache, rather than by making a network call to the server device. However, when two or more UI screens are dependent on the same underlying data, a modification to the underlying data performed using one of these UI screens may cause a cached version of another one of these UI screens to become stale. Thus, when a modification is made to underlying data by way of a particular UI screen, the server device may be configured to (i) regenerate and transmit an updated version of the particular UI screen and, in some cases, (ii) regenerate and transmit updated versions of one or more previously viewed UI screens that are affected by the modification. Such an approach may, however, unnecessarily expend computing and/or communication resources, since the software application might not be used to view any of the updated versions of the one or more previously viewed UI screens that are affected by the modification.

Accordingly, the software application may instead be configured to track the previously viewed UI screens, identify a stale subset thereof, and incrementally pre-fetch a UI screen that is expected to be revisited next. Specifically, as the software application is used to navigate through the UI screens thereof, the software application may be configured to track a plurality of UI screens that have been navigated to and/or maintain an ordered list indicative of the order in which these UI screens have been visited. When an interaction with a UI component of a currently displayed UI screen causes a modification to underlying data, the software application may be configured to determine a stale set of UI components, which may include a subset of the plurality of UI components that have possibly been rendered stale by the modification. The stale set may be identified, for example, based on the tab to which the currently displayed UI component belongs, and/or based on a dependency map that indicates which UI screens and/or UI components utilize the modified data. The stale set may be updated as updated versions of UI screens are obtained and/or additional modifications are performed.

Additionally, the software application may be configured to identify a next UI screen that is expected to be revisited after the currently displayed UI screen and, if the next UI screen is stale, pre-fetch the next UI screen before a user request therefor is received by the software application. Thus, when the software application receives the user request for the next UI screen, the software application may be able to provide the updated, rather than the stale, version of the next UI screen from the cache, and the user thus might not need to wait for the updated version of the next UI screen to be obtained from the server device. Further, since the cache may already contain the updated version of the next UI screen, the user might not need to determine whether to manually request a refresh of the next UI screen, and may thus avoid requesting a refresh where one is not needed.

As the user navigates through the software application, subsequent UI screens expected to be visited next may be determined and pre-fetched one at a time, thereby avoiding the generation and/or transmission of updated versions of UI screens that might not actually be navigated back to by the user. In one example, the next and/or subsequent UI screens may be determined based on a reverse of the order in which the plurality of UI screens have initially been navigated to, with the most recently viewed UI screen being pre-fetched first. In another example, the next and/or subsequent UI screens may be determined based on a workflow model that defines an intended and/or empirically observed sequences of UI screen viewings.

Accordingly, a first example embodiment may involve a computing system that includes a processor, a memory, and a software application stored in the memory and configured to perform, when executed by the processor, operations. The operations may include determining a plurality of user interface (UI) screens of the software application that have been navigated to by way of a UI of the software application. The operations may also include receiving, by way of the UI, an interaction with a UI component of a current UI screen of the plurality of UI screens, and, based on receiving the interaction, determining a next UI screen of the plurality of UI screens that is expected to be revisited after the current UI screen. The operations may additionally include, prior to receiving a request to navigate to the next UI screen, transmitting, to a server device, a query for an updated version of the next UI screen. The operations may further include receiving, from the server device, a response that includes the updated version of the next UI screen and, based on receiving the request to navigate to the next UI screen, displaying, by way of the UI and based on the response, the updated version of the next UI screen.

A second example embodiment may involve determining a plurality of UI screens of a software application that have been navigated to by way of a UI of the software application. The second example embodiment may also involve receiving, by way of the UI, an interaction with a UI component of a current UI screen of the plurality of UI screens, and, based on receiving the interaction, determining a next UI screen of the plurality of UI screens that is expected to be revisited after the current UI screen. The second example embodiment may additionally involve, prior to receiving a request to navigate to the next UI screen, transmitting, to a server device, a query for an updated version of the next UI screen. The second example embodiment may further involve receiving, from the server device, a response that includes the updated version of the next UI screen and, based on receiving the request to navigate to the next UI screen, displaying, by way of the UI and based on the response, the updated version of the next UI screen.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
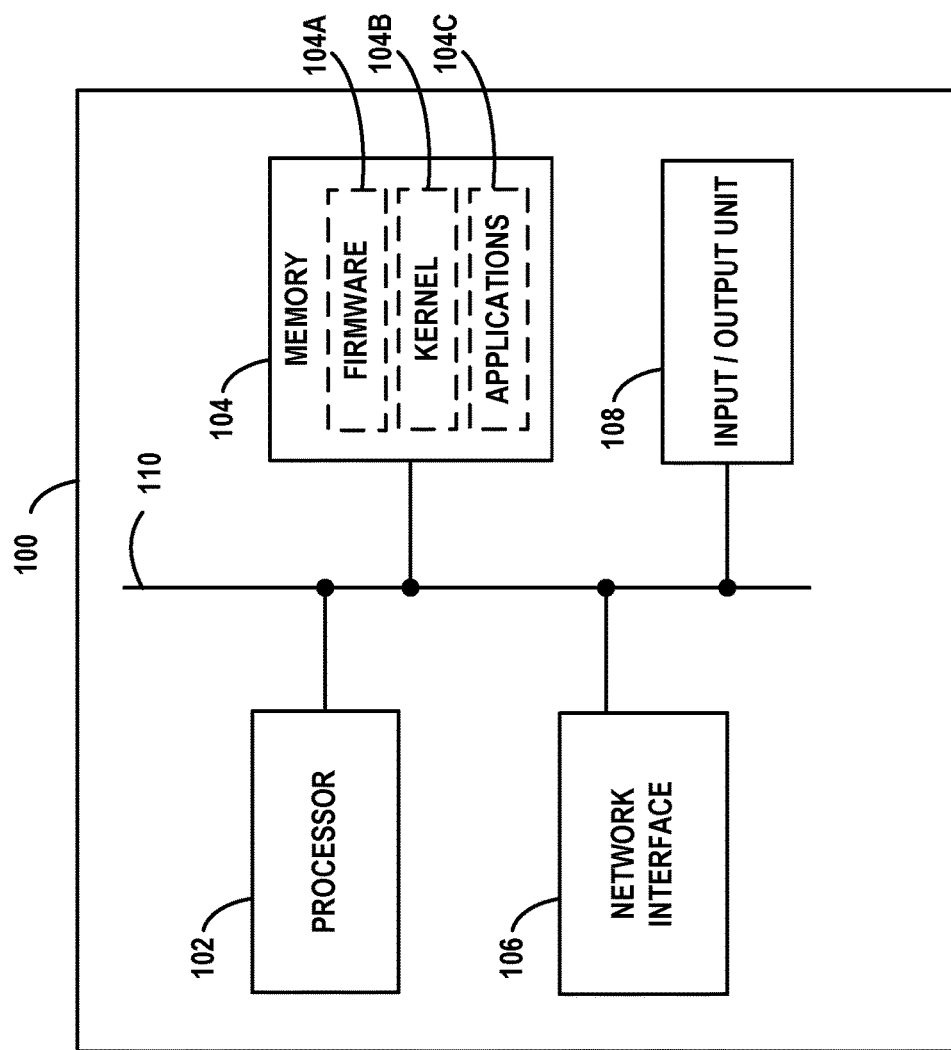
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling, and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
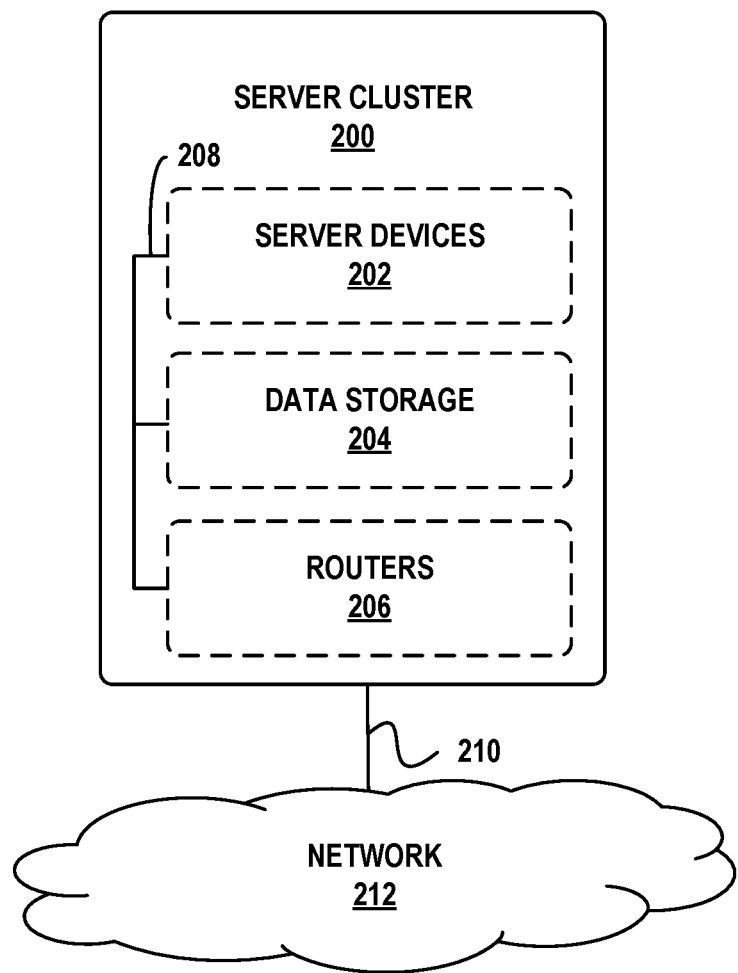
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
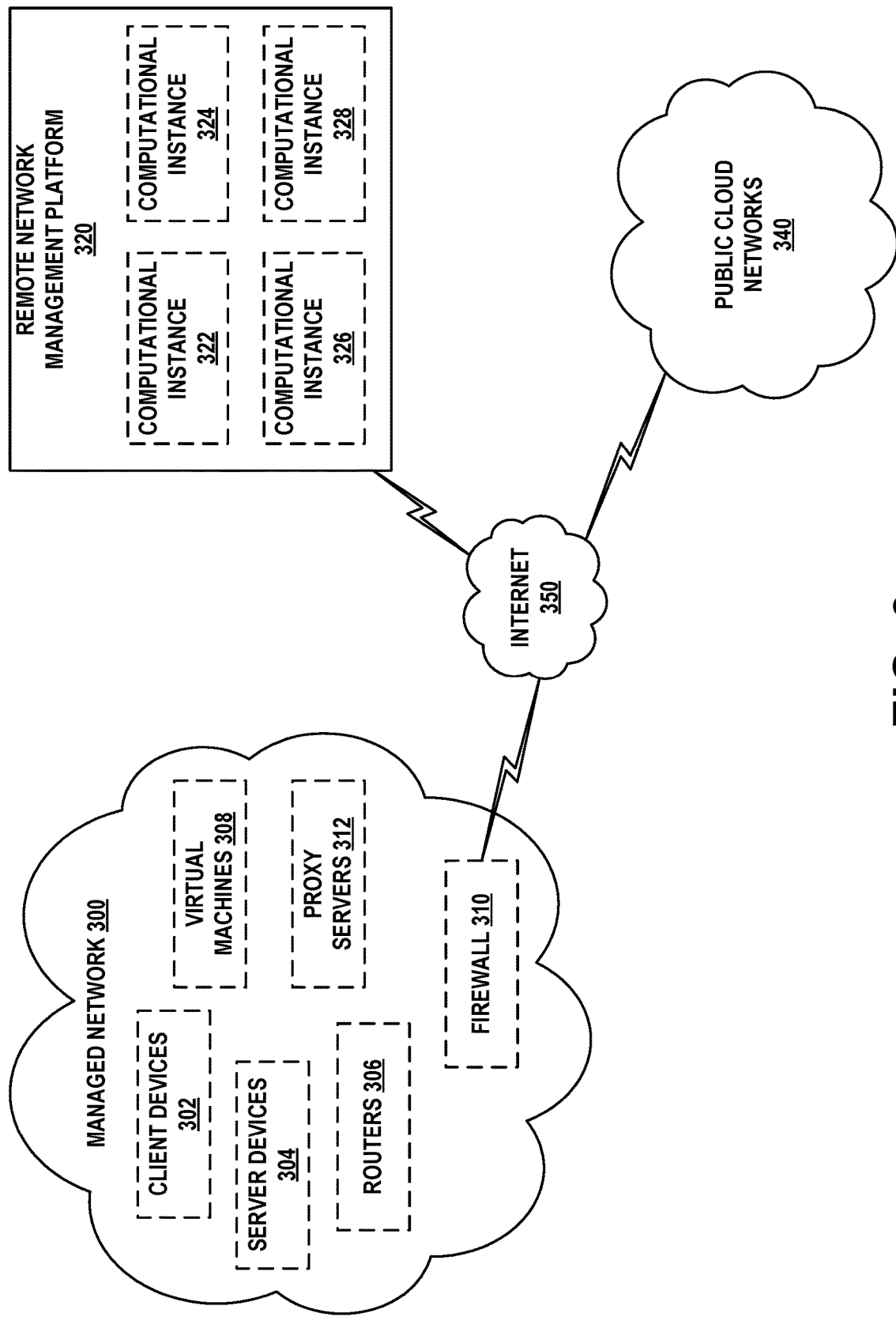
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
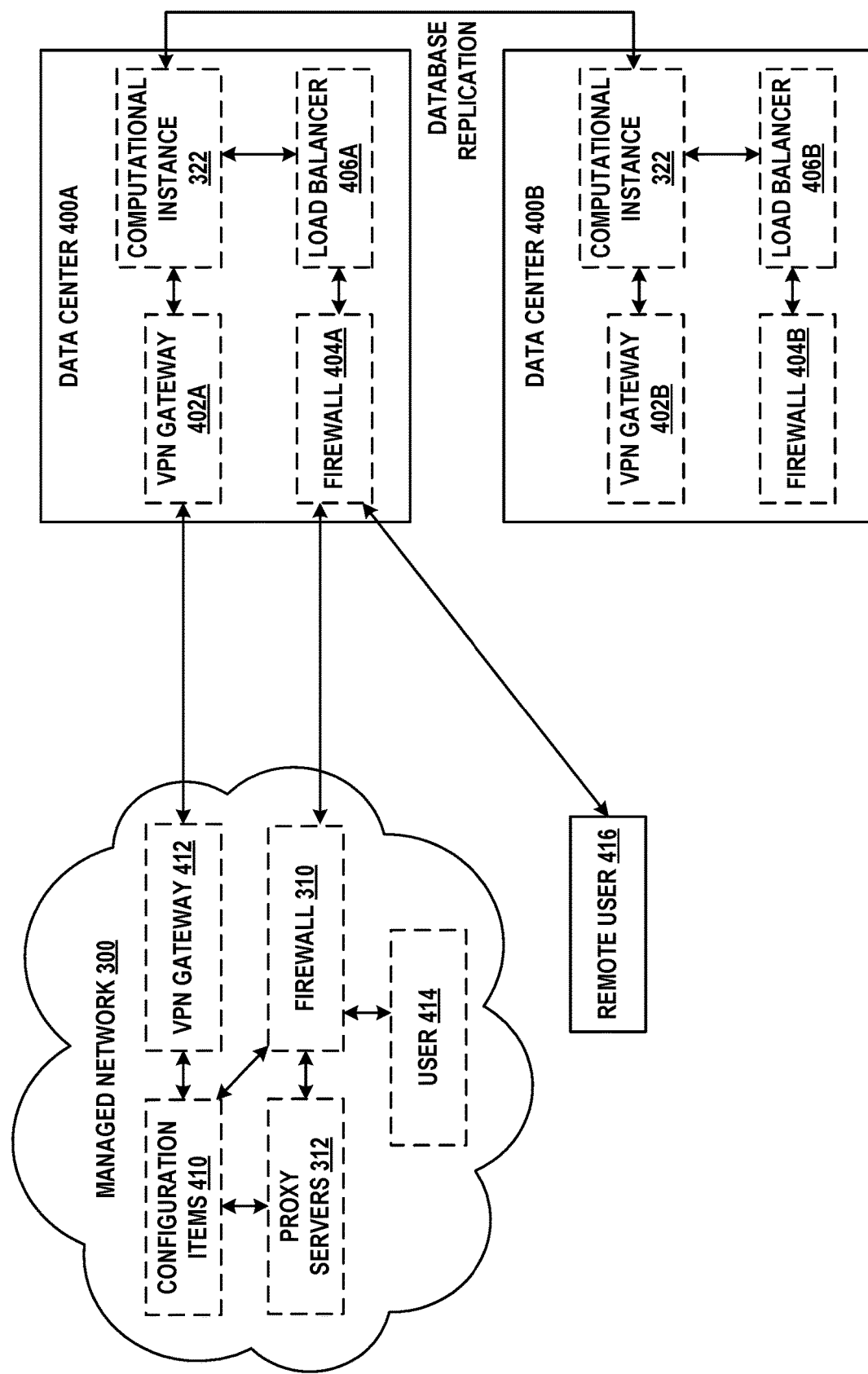
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
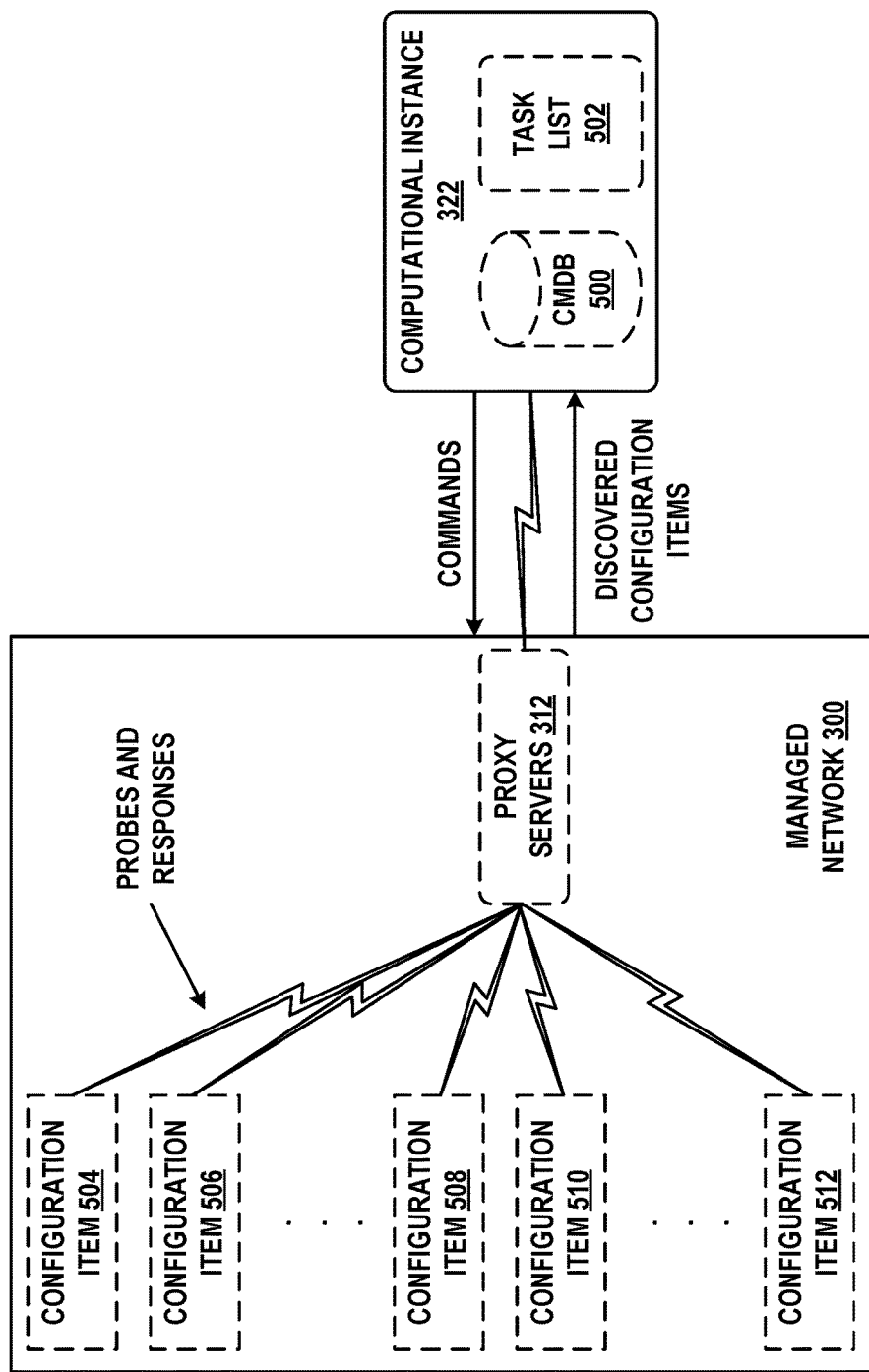
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
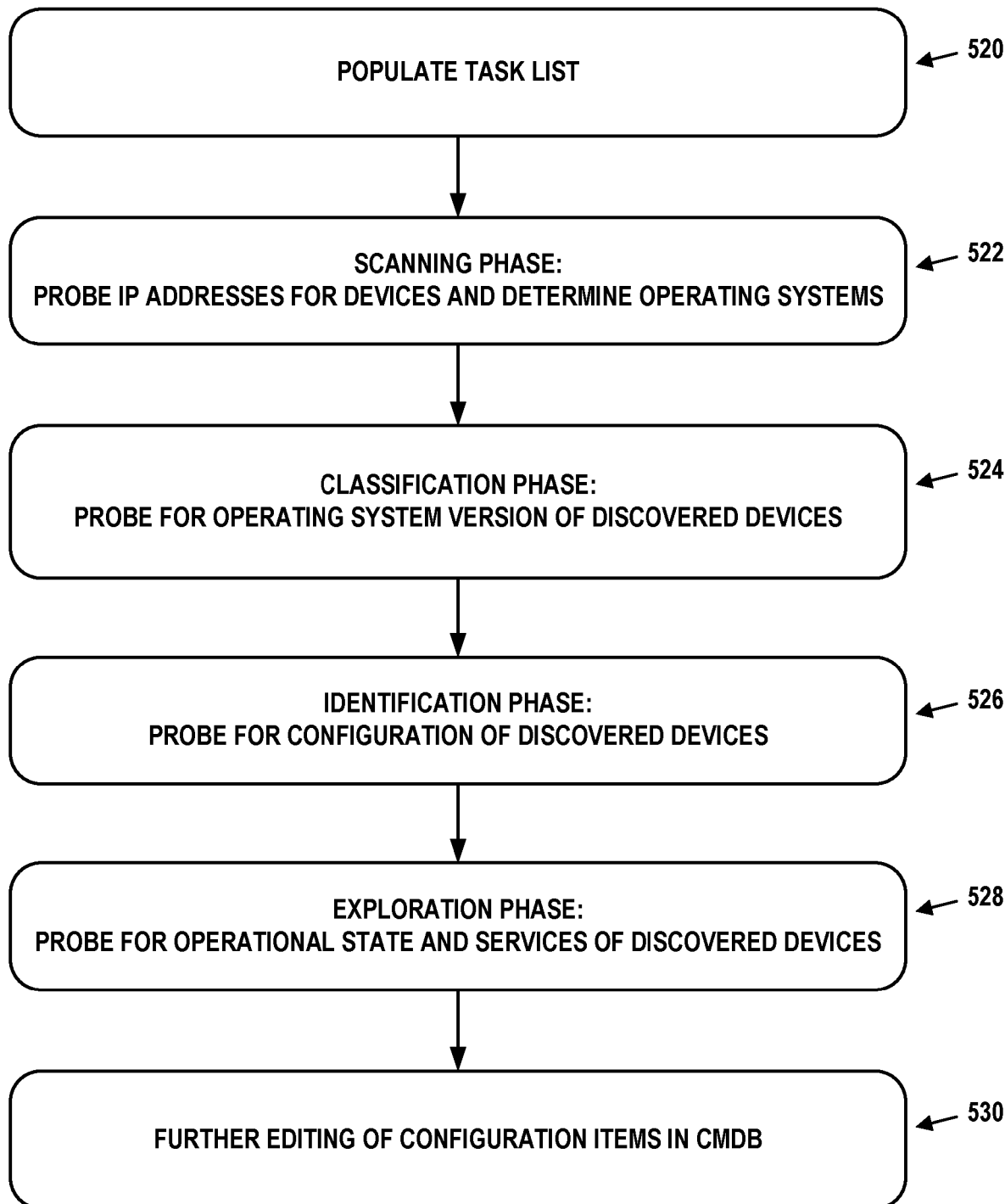
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Example Software Application

Figure 6:
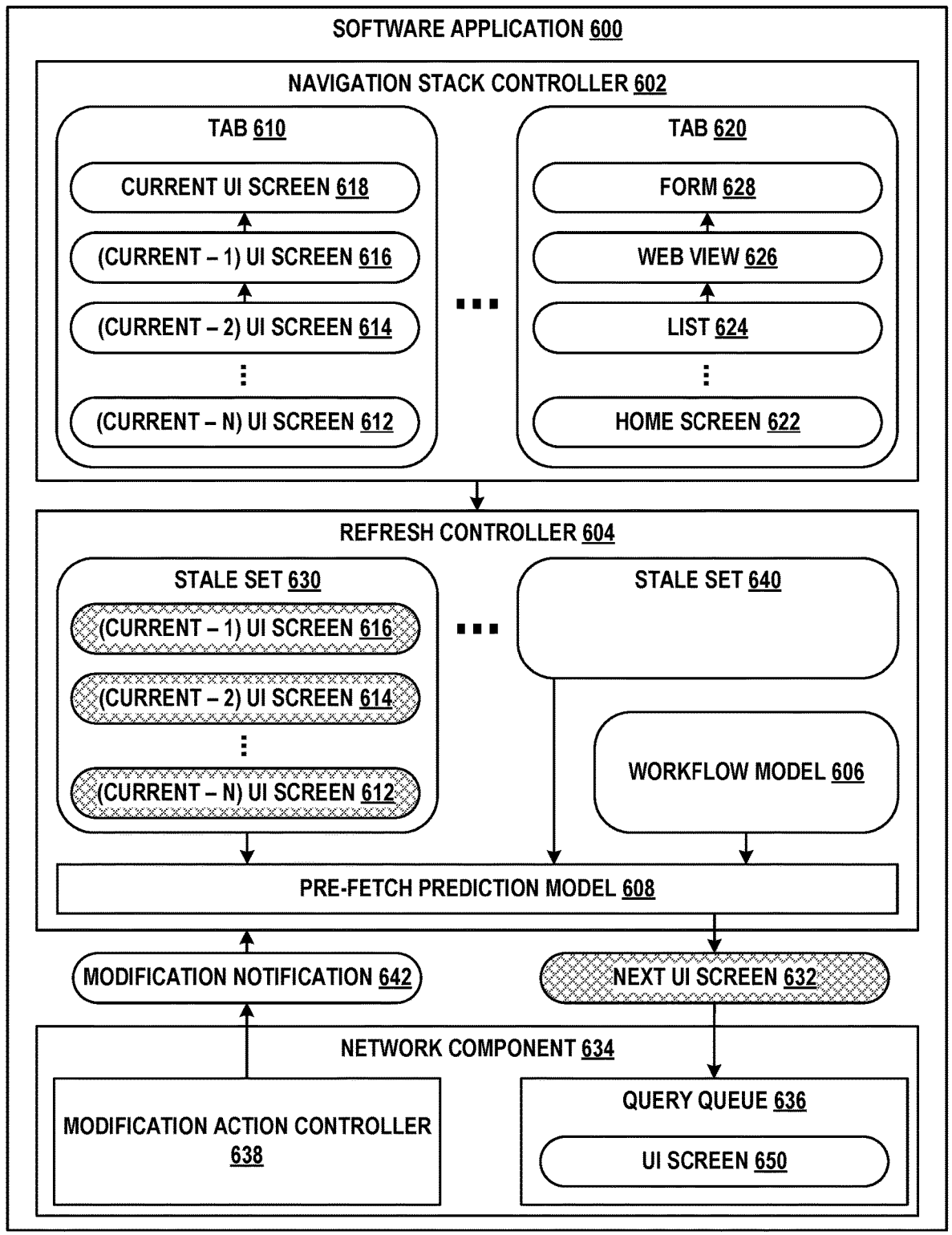
FIG. 6 depicts aspects of a software application, in accordance with example embodiments.

FIG. 6 illustrates aspects of an example software application. Software application 600 may be, for example, a native software application configured to execute on a particular mobile platform and/or a software application accessible by way of a web browser. Specifically, software application 600 may include navigation stack controller 602, refresh controller 604, and network component 634. These components of software application 600 may operate to update stale UI screens of software application 600 before these stale UI screens are requested and/or displayed by way of a UI.

Specifically, software application 600 may be configured to provide a plurality of UI screens, each of which may include one or more corresponding UI components. In some cases, the plurality of UI screens may be organized into one or more tabs, each of which may define a corresponding group of one or more UI screens. The plurality of UI screens and the corresponding UI components thereof may, when viewed by and/or interacted with by a user, provide an intended functionality of software application 600, which may vary among implementations. Software application 600 may, based on and/or in response to user input, request a UI screen of the plurality of UI screens from a server device, which may be configured to generate the requested UI screen and transmit it to software application 600. Additionally, software application 600 may be configured to cache the UI screens that have been received from the server device.

Data dependencies may exist between different UI screens of the plurality of UI screens. That is, multiple UI screens may each depend on (e.g., use and/or display) the same data and/or UI component. Accordingly, a modification to a particular data and/or a particular UI component performed by way of a first UI screen may affect a second UI screen such that, if the second UI screen is not regenerated and retransmitted to software application 600 after the modification has been completed by the server device, the second UI screen will display a stale version of the particular data and/or the particular UI component.

It may be possible for the server device to, based on the modification of the particular data and/or the particular UI component, generate an updated version of every UI screen affected by this modification (or every previously-viewed UI screen affected by this modification), and provide the updated versions of these UI screens to software application 600. However, such an approach may be inefficient and wasteful, since the updated versions of these UI screens might not be viewed by way of software application 600. For example, a user might instead request to view other UI screens, and/or or end a usage session, resulting in unnecessary expenditure of computational resources of the server device and communication bandwidth between software application 600 and the server device.

Accordingly, navigation stack controller 602, refresh controller 604, and network component 634 may instead operate to predictively and incrementally refresh and/or update stale UI screens of software application 600. Specifically, navigation stack controller 602 may be configured to determine a plurality of UI screens that have been navigated to by way of a UI of software application 600. The plurality of UI screens that have been navigated to by way of the UI may include, for example, UI screens that, during a particular usage session and/or time window, have been requested and/or viewed by way of the UI, and are therefore cached in a memory utilized by software application 600.

In the example shown in FIG. 6, the plurality of UI screens of software application 600 may be arranged into a plurality of tabs, as represented by tab 610 through tab 620 (i.e., tabs 610-620). Navigation stack controller 602 may thus be configured to, for each respective tab of tabs 610-620, track one or more UI screens that belong to the respective tab and have been navigated to by way of the UI. In some implementations, navigation stack controller 602 may be configured to, for each respective tab of tabs 610-620, generate an ordered list (e.g., a stack) of the one or more UI screens based on an order according to which the one or more UI screens have been navigated.

For example, for tab 610, the ordered list may include, in reverse order, current UI screen 618, (current-1) UI screen 616, and (current-2) UI screen 614 through (current-N) UI screen 612 (i.e., collectively, UI screens 612-618). Thus, UI screens 612-618 may form a stack, with (current-N) UI screen 612 at the bottom of the stack, indicating that this UI screen 612 was viewed first under tab 610, and current UI screen 618 at the top of the stack, indicating that current UI screen 618 was viewed most recently and/or is being viewed currently under tab 610. Similarly, for tab 620, the ordered list may include, in reverse order, form 628, web view 626, and list 624 through home screen 622 (i.e., collectively, UI screens 622-628).

Thus, specific examples of UI screens may include home screens, lists, web views, and forms, as well as overlays, modal windows, cards, and/or tables, among other possibilities. Specific examples of the UI components that make up the UI screens may include individual data fields, data entries, buttons, text fields, checkboxes, radio buttons, dropdowns, and/or icons, among other possibilities. In general, a tab may include a grouping of one or more UI screens, each of which may be displayable at different times using the same region of a UI and/or at the same time using different regions of the UI. A UI screen may include one or more UI components, which may define the visual appearance and/or functionality of the UI screen. Depending on the context, a UI element may be considered a screen (e.g., when it is a direct subset of a tab) or a component (e.g., when it is a direct subset of a UI screen). In some cases, the UI screens of a given tab may be related to one another. For example, the UI screens of the given tab may operate on the same or similar data and/or may perform related functions. Thus, in some cases, the UI screens of the given tab may be data-dependent on one another, but the UI screens of different tabs may be data-independent from one another. In other cases, data dependencies can exist across tabs.

Refresh controller 604 may be configured to (i) track the staleness of the plurality of previously viewed UI components identified by navigation stack controller 602 and (ii) determine next UI screen 632 that has been previously viewed, is stale, is expected to be navigated back to and/or revisited next, and should therefore be refreshed next. Specifically, refresh controller 604 may be configured to generate and update stale set 630 through stale set 640 (i.e., stale sets 630-640). Stale set 630 may correspond to tab 610, and stale set 640 may correspond to tab 620, with the other stale sets (indicated by the ellipsis separating stale sets 630 and 640) associated with corresponding other tabs (indicated by the ellipsis separating tabs 610 and 620).

In the example illustrated in FIG. 6, stale set 630 indicates that (current-1) UI screen 616 and (current-2) UI screen 614 through (current-N) UI screen 612 are stale, while stale set 640 is empty. Thus, stale set 630 also indicates that current UI screen 618 is up to date, and stale set 640 indicates that UI screens 622-628 are up to date. Thus, in some implementations, each respective stale set of stale sets 630-640 may store a representation of a respective UI screen when the respective UI screen is stale, but might not contain a representation of the respective UI screen when the respective UI screen is up to date, as shown in FIG. 6. In other implementations, each respective stale set of stale sets 630-640 may represent each respective UI screen of its corresponding tab and store an indication of whether the respective UI screen is stale or up to date.

Modification action controller 638 of network component 634 may be configured to notify refresh controller 604 when a modification is made by way of a UI screen. In some implementations, the modification may alternatively be referred to as a write-back action, since it may involve writing updated data back to the server device. Specifically, modification action controller 638 may be configured to generate modification notification 642 and provide it to refresh controller 604. Modification notification 642 may indicate a UI screen by way of which a modification to underlying data was requested. For example, modification action controller 638 may be configured to monitor the queries that are added to query queue 636, and identify (i) queries that involve a request to execute an action that involves a modification to underlying data and (ii) the corresponding UI screens from which these queries originate. Modification action controller 638 may be configured to determine whether a query is requesting a modification to underlying data based on, for example, an address to which the query is directed and/or a content of the request.

Refresh controller 604 may be configured to mark a first UI screen as stale when an interaction with a UI component of a second UI screen causes a modification that affects the first UI screen. For example, the modification may include a change to data and/or a UI component displayed by the first UI screen. Thus, the staleness of the first UI screen may be based on the first UI screen and the second UI screen sharing a data dependency, which may influence the content and/or the visual appearance of both UI screens.

In some implementations, refresh controller 604 may be configured to treat all UI screens of a given tab as sharing a data dependency. Thus, when a modification is made using one UI screen of a plurality of UI screens of the given tab, all previously viewed UI screens of the given tab may be marked as stale by refresh controller 604. Thus, for example, when a modification is made using current UI screen 618, (current-N) UI screen 612-(current-1) UI screen 616 may be marked as stale, as shown in FIG. 6.

Notably, UI screens of the given tab that have not previously been navigated to might not be marked as stale, since representations of these previously unseen screens might not be cached by software application 600. Accordingly, when one of these previously unseen UI screens is requested, such a UI screen will be obtained from the server device, which will generate an up-to-date version thereof that reflects any prior modifications to the underlying data. Further, the UI screen by way of which the modification is made (e.g., current UI screen 618) also might not be marked as stale, since executing this modification may involve a communication between software application 600 and the server device, with the server device providing software application 600 an updated version of this UI screen in response to the request for executing the modification.

In other implementations, refresh controller 604 may be configured to treat all UI screens of all tabs as sharing a data dependency. Thus, when a modification is made using one UI screen of a plurality of UI screens of software application 600, all previously viewed UI screens across all tabs may be marked as stale by refresh controller 604. In such an implementation, when, for example, a modification is made using current UI screen 618, (current-N) UI screen 612-(current-1) UI screen 616 of tab 610, UI screens 622-628 of tab 620, and any other previously viewed UI screens of any other tabs may be marked as stale.

In further implementations, refresh controller 604 may have access to a dependency map that indicates the shared data dependencies among the plurality of UI screens of software application 600. The dependency map may alternatively be referred to as a dependency graph and/or a dependency model, and may be obtained, for example, as part of installation of software application 600 and/or while obtaining one or more UI screens from the server device, among other possibilities.

The dependency map may provide screen-level dependencies and/or component-level dependencies. In one example, a screen-level dependency map may indicate, for each respective UI screen of the plurality of UI screens of software application 600, zero or more other UI screens that may be affected by a modification performed by way of any UI component of the respective UI screen. Within examples, the zero or more UI screens affected by a modification performed by a first UI screen may be different from the zero or more UI screens affected by a modification performed by a second UI screen. In another example, a component-level dependency map may indicate, for each respective UI component of a plurality of UI components included as part of the plurality of UI screens of software application 600, zero or more other UI components that may be affected by a modification performed by way of the respective UI component. Within examples, the zero or more UI components affected by a modification performed using a first UI component may be different from the zero or more UI components affected by a modification performed using a second UI component.

The different approaches described above for determining stale tabs may each be associated with different trade-offs, some of which may become more pronounced as the number of UI screens and/or UI components of software application 600 increases. For example, the component-level dependency map may allow for an accurate determination of stale UI screens, but may utilize more storage and/or processing resources than the screen-level dependency map and/or the tab-based approaches. Conversely, the screen-level dependency map and/or the tab-based approaches may sometimes obtain updated versions of UI components that have not been affected by a given modification, but might not utilize significant memory and/or processing resources. The specific approach for determining stale tabs may be a user-controllable and/or a programmer-controllable parameter of software application 600, and may be selected based on, for example, availability of memory and/or computing resources, structure of software application 600, and/or available communication bandwidth between software application 600 and the server device, among other possibilities.

Pre-fetch prediction model 608 of refresh controller may be configured to determine next UI screen 632. Specifically, next UI screen 632 may be selected from stale sets 630-640 and may be expected to be revisited after a current UI screen (e.g., current UI screen 618) that is currently being displayed by software application 600. In some cases, next UI screen 632 may be expected to be revisited immediately after the current UI screen. In other cases, one or more intermediate UI screens that have not been previously navigated to may be requested after the current UI screen and before the next UI screen 632 is requested to be revisited. Next UI screen 632 may represent, for example, one of (current-N) UI screen 612 through (current-1) UI screen 616.

Next UI screen 632 may be provided to query queue 636 of network component 634, which may cause network component 634 to obtain, from the server device, an updated version of next UI screen 632. Query queue 636 is shown as already containing therein UI screen 650, which may have been requested, for example, based on a user interaction with software application 600 and/or to which there might not have been previous navigation. By adding next UI screen 632 to query queue 636, software application 600 may be configured to at least request, and possibly also obtain, the updated version of next UI screen 632 before a user interaction indicates to navigate back to next UI screen 632. Thus, an updated version of next UI screen 632 may be requested and/or pre-fetched before next UI screen 632 is revisited, thus avoiding displaying a stale version of next UI screen 632.

In some cases, an addition to query queue 636 of another user-originated request for a UI screen other than next UI screen 632 may be prioritized relative to next UI screen 632, may cause next UI screen 632 to be removed from query queue 636, and/or may cause a query for next UI screen 632 to be otherwise cancelled. For example, reception, by the server device, of a query corresponding to the user-originated request may cause the server device to avoid and/or terminate generation of the updated version of next UI screen 632. Thus, next UI screen 632 may remain stale until, for example, it is again reselected to be pre-fetched.

In some implementations, pre-fetch prediction model 608 may be configured to identify next UI screen 632 based on the respective ordered list of previously viewed UI screens maintained for each of tabs 610-620. Specifically, pre-fetch prediction model 608 may be configured to select, as next UI screen 632, the UI screen that precedes a currently displayed UI screen in the corresponding ordered list for the current tab. For example, when current UI screen 618 is being displayed by software application 600, (current-1) UI screen 616 may be selected as a candidate for next UI screen 632. Based on selecting (current-1) UI screen 616 as the candidate for next UI screen 632, pre-fetch prediction model 608 may be configured to determine, using stale set 630, whether (current-1) UI screen 616 is stale. Based on determining that (current-1) UI screen 616 is stale, it may be selected as next UI screen 632.

In another example, if (current-1) UI screen 616 were to be currently displayed by software application 600, (current-2) UI screen 614 would be selected as next UI screen 632. In a further example, if form 628 were to be currently displayed by software application 600, web view 626 would not be selected as next UI screen 632, since web view 626 is not part of stale set 640. Web view 626 would, however, be selected as next UI screen 632 if it were part of stale set 640. Pre-fetching stale UI screens in this manner may be based on an expectation that a user is likely to navigate back through previously viewed UI screens in reverse of the order in which the user first requested these UI screens.

In other implementations, pre-fetch prediction model 608 may be configured to select next UI screen based on workflow model 606. Workflow model 606 may define sequences in which the UI screens of software application 600 were intended and/or designed to be viewed, and/or sequences in which the UI screens of software application 600 have been empirically observed to be viewed. For example, workflow model 606 may represent each UI screen of software application as a node, and edges/arrows between nodes may indicate likely sequences through the nodes. Thus, pre-fetch prediction model 608 may be configured to select, as next UI screen 632, a UI screen that follows a currently displayed UI screen in workflow model 606. In cases where a node includes multiple edges/arrows emanating therefrom to different subsequent nodes, each edge/arrow may be associated with a value that indicates a likelihood of that edge/arrow being followed. Thus, pre-fetch prediction model 608 may be configured to select, as next UI screen 632, a UI screen that is most likely to follow the currently displayed UI screen in workflow model 606. In some cases, pre-fetch prediction model 608 may be configured to select, as next UI screen 632, two or more of the UI screens that follow the currently displayed UI screen in workflow model 606.

In further implementations, pre-fetch prediction model 608 may be configured to determine next UI screen 632 based on a plurality of inputs. For example, pre-fetch prediction model 608 may include a machine learning model, such as an artificial neural network, that has been trained to determine next UI screen 632 based on the plurality of inputs. The plurality of inputs may include, for example, the ordered lists for tabs 610-620, stale sets 630-640, workflow model 606, and/or the UI component by way of which a most recent modification was made, among other possible inputs. Thus, the machine learning model may consider the navigation history, the intended and/or empirical use of software application 600, and/or the source of the data modification in determining next UI screen 632.

VI. Example Stale UI Screen Detection and Pre-Fetching Operations

Figure 7A:
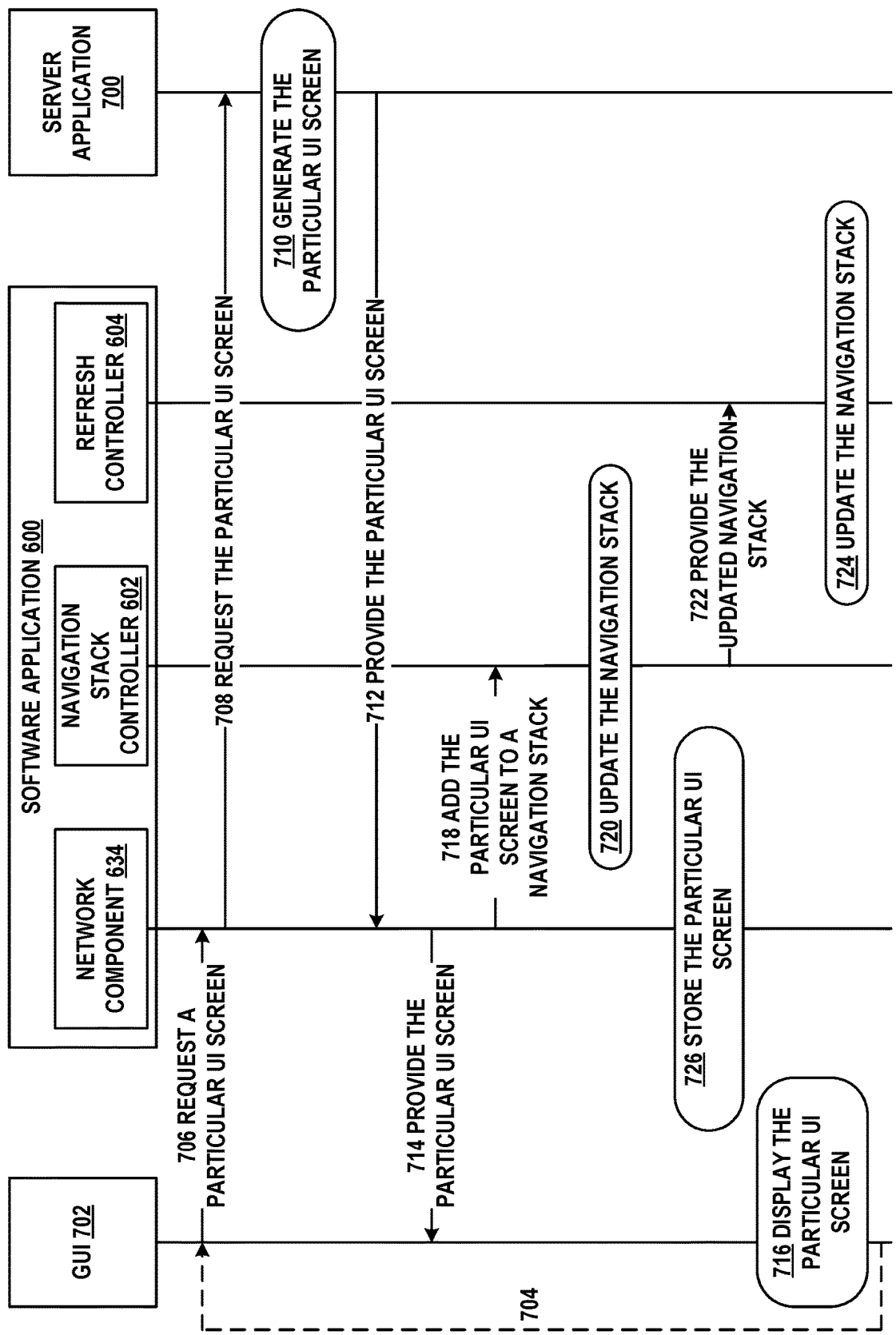
FIGS. 7A, 7B, and 7C are message flow diagrams, in accordance with example embodiments.
Figure 7B:
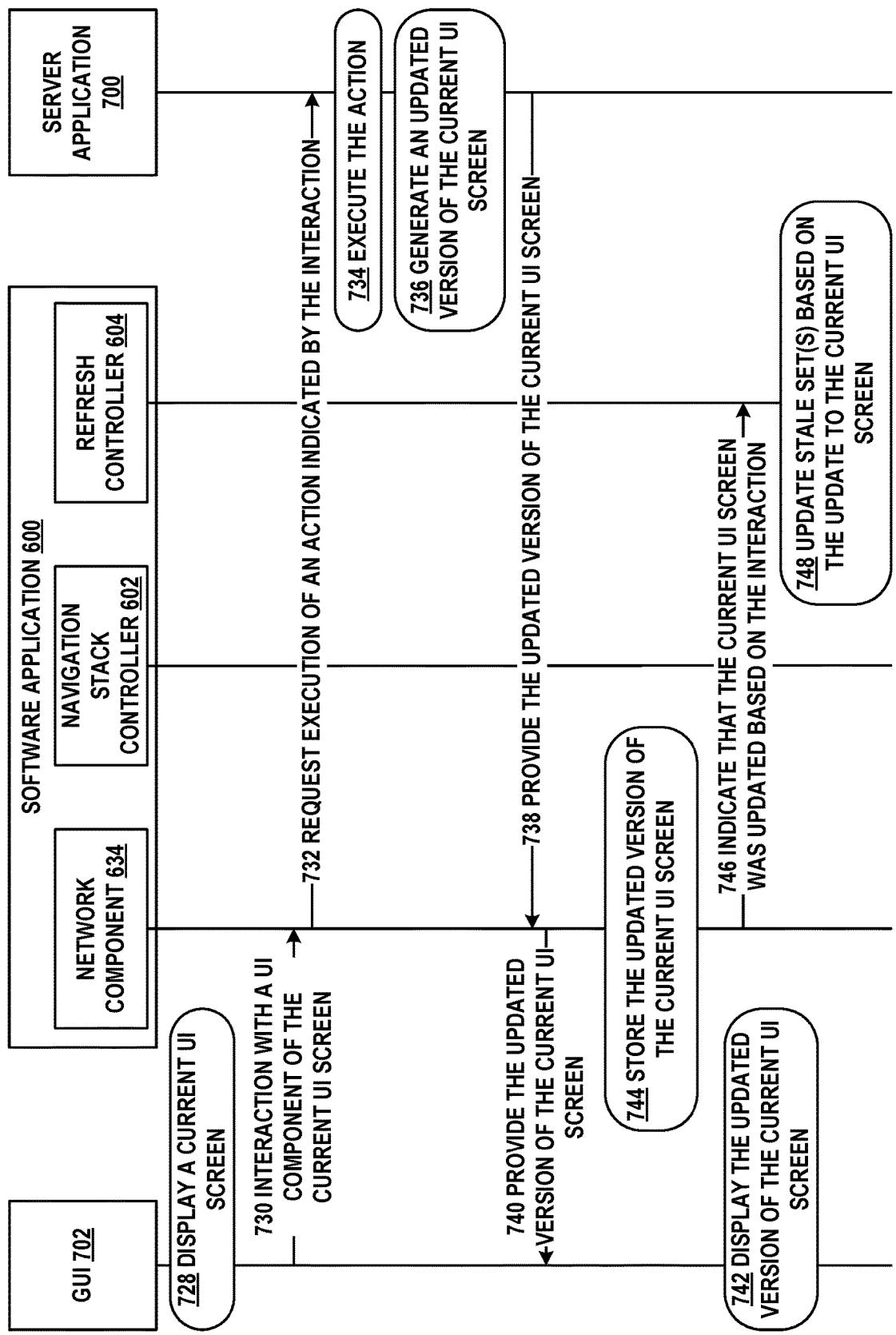
Figure 7C:
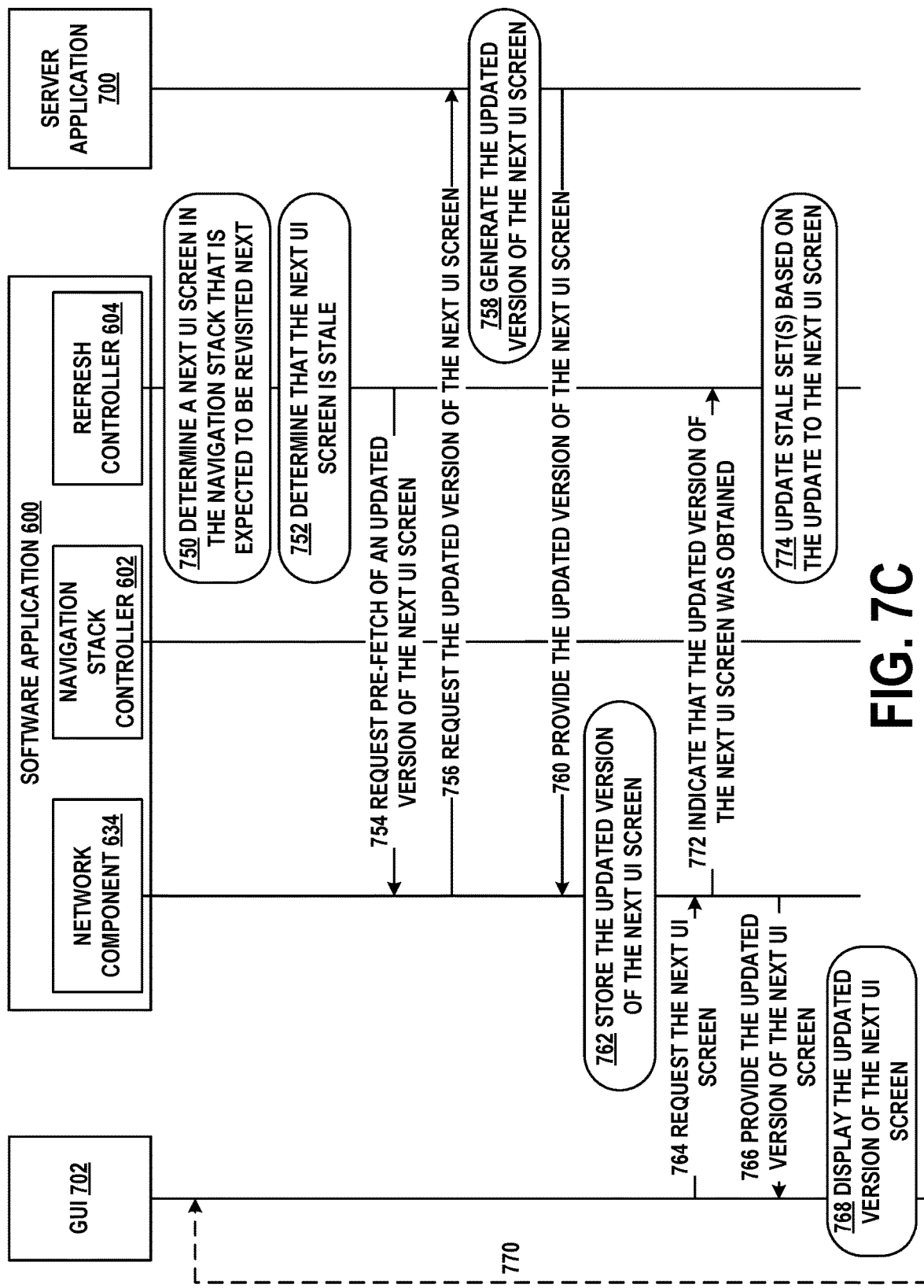

FIGS. 7A, 7B, and 7C are message flow diagrams that illustrate operations of GUI 702, software application 600, and server application 700 involved in pre-fetching stale UI screens. Specifically, GUI 702 may be provided by a client computing device on which software application 600 is executing, and may thus be configured to display the UI screens of software application 600. Server application 700 may be executed by a server device that hosts and/or provides back-end services to software application 600. In some implementations, server application 700 may be provided by a computational instance of remote network management platform 320, and/or GUI 702 and software application 600 may be disposed within managed network 300.

FIG. 7A illustrates operations related to generating a navigation stack based on navigation across UI screens of software application 600. Specifically, GUI 702 may be configured to transmit, to network component 634, a request for a particular UI screen, as indicated by arrow 706. The particular UI screen requested at arrow 706 might not have been previously navigated to and/or viewed by way of software application 600, and a representation thereof thus might not be cached by software application 600. Based on and/or in response to reception of the request at arrow 706, network component 634 may be configured to transmit, to server application 700, a request/query for the particular UI screen, as indicated by arrow 708. Based on and/or in response to reception of the request/query at arrow 708, server application 700 may be configured to generate the particular UI screen, as indicated by block 710. Based on and/or in response to generation of the particular UI screen at block 710, server application 700 may be configured to provide the particular UI screen to network component 634, as indicated by arrow 712.

Based on and/or in response to reception of the particular UI screen at arrow 712, network component 634 may be configured to provide the particular UI screen to GUI 702, as indicated by arrow 714. Based on and/or in response to reception of the particular screen at arrow 714, GUI 702 may be configured to display the particular UI screen, as indicated by block 716.

Based on and/or in response to reception of the particular UI screen at arrow 712, network component 634 may also be configured to provide, to navigation stack controller 602, an indication to add the particular UI screen to a navigation stack, as indicated by arrow 718. Based on and/or in reception of the indication at arrow 718, navigation stack controller 602 may be configured to update the navigations stack, as indicated by block 720. For example, in implementations that group UI screens into tabs, navigation stack controller 602 may be configured to update a navigation stack of a tab to which the particular UI screen belongs, thus tracking the sequence of UI screens viewed within the tab. In some cases, navigation stack controller 602 may additionally or alternatively maintain (i) a global navigation stack that tracks previously viewed UI screens independently of the tab to which the UI screens belong, and/or (ii) a tab navigation stack that tracks an order in which different tabs have been viewed by accessing one or more UI screens thereof.

Based on and/or in response to updating of the navigation stack at block 720, navigation stack controller 602 may be configured to provide, to refresh controller 604, the updated navigation stack, as indicated by arrow 722. Based on and/or in response to reception of the updated navigation stack at arrow 722, refresh controller 604 may be configured to update its own representation of the navigation stack, as indicated by block 724. For example, refresh controller 604 may be configured to add the particular UI screen to a corresponding stale set, and mark the particular UI screen as up to date (i.e., not stale), thus providing refresh controller 604 with a pool of candidate UI screens that could be marked as stale when a modification is made at a future time.

In some implementations, the operations of arrow 722 and block 724 may be omitted and/or performed at the later time. For example, refresh controller 604 may instead be configured to obtain the updated navigation stack from navigation stack controller 602 when the modification is made at the future time. Thus, the stale sets of refresh controller 604 may be used to represent UI screens that are stale, but might not be used to represent UI screens that could be stale but are not yet stale.

Based on and/or in response to reception of the particular UI screen at arrow 712, network component 634 may further be configured to store the particular UI screen in a memory of the client computing device. Thus, when a request to revisit the particular UI screen is received from GUI 702 at a later time, the particular UI screen may be provided to GUI 702 without contacting server application 700. The operations of arrow 706 through block 726 may be repeated one or more times to obtain additional UI screens, as indicated by arrow 704, resulting in a larger navigation stack and more UI screens stored in the memory. Interactions with other UI screens may cause modifications that result in the particular UI screen as stored in the memory becoming stale.

FIG. 7B illustrates operations related to determining stale UI screens based on an interaction performed by way of a UI screen of software application 600. Specifically, GUI 702 may be configured to display a current UI screen, as indicated by block 728. The current UI screen may be any UI screen of the plurality of UI screens provided by software application 600, and may be designated as "current" in that it is currently displayed by GUI 702. Based on and/or in response to displaying the current screen at block 728 and receiving an interaction with a UI component thereof, GUI 702 may be configured to provide, to network component 634, a representation of the interaction with the UI component of the current UI screen, as indicated by arrow 730.

Based on and/or in response to reception of the interaction at arrow 730, network component 634 may be configured to transmit, to server application 700, a request/query for execution of an action indicated by the interaction, as indicated by arrow 732. Based on and/or in response to reception of the request/query at arrow 732, server application 700 may be configured to execute the action, as indicated by block 734. Execution of the action may involve a modification to data maintained by server application 700 on behalf of software application 600. Accordingly, at least part of the current UI screen and possibly respective parts of one or more other UI screens may be affected by the modification. The action could be based on the user having edited a text box, selected an option from a drop-down menu, and/or checked or unchecked a checkbox, among other possibilities.

Thus, based on and/or in response to execution of the action at block 734, server application 700 may be configured to generate an updated version of the current UI screen, as indicated by block 736. Based on and/or in response to generation of the updated version of the current UI screen at block 736, server application 700 may be configured to transmit, to network component 634, the updated version of the current UI screen, as indicated by arrow 738. Notably, updated version of the one or more other UI screens that are affected by the modification might not be generated at this time, since the generation and/or transmission thereof might be wasteful if these updated versions are not, after reception by software application 600, actually requested to be viewed by way of GUI 702.

Based on and/or in response to reception of the updated version of the current UI screen at arrow 738, network component 634 may be configured to provide the updated version of the current UI screen to GUI 702, as indicated by arrow 740. Based on and/or in response to reception of the updated version of the current UI screen at arrow 740, GUI 702 may be configured to display the updated version of the current UI screen, as indicated by block 742. Thus, GUI 702 may provide visual feedback indicative of successful execution of the action indicated by the interaction at arrow 730.

Based on and/or in response to reception of the updated version of the current UI screen at arrow 738, network component 634 may also be configured to store, in the memory of the client device, the updated version of the current UI screen, as indicated by block 744. Based on and/or in response to reception of the updated version of the current UI screen at arrow 738, network component 634 may be further configured to provide, to refresh controller 604, an indication that the current UI screen was updated based on the interaction, as indicated by arrow 746. The indication of arrow 746 may thus inform refresh controller 604 that the action indicated by the interaction was successfully executed, resulting in a modification of corresponding data, and possibly turning one or more cached UI screens stale.

Accordingly, based on and/or in response to reception of the indication at arrow 746, refresh controller 604 may be configured to update one or more stale sets maintained by refresh controller 604 based on the update to the current UI screen, as indicated by block 748. The update of the one or more stale sets may be based on an actual and/or approximated dependency, as discussed with respect to FIG. 6, of one or more UI screens on the data modified by execution of the action indicated by the interaction of arrow 730.

FIG. 7C illustrates operations related to updating stale UI screens by incrementally pre-fetching updated versions thereof. Specifically, refresh controller 604 may be configured to determine a next UI screen in the navigation stack that is expected to be revisited next, as indicated by block 750. The operations of block 750 may be performed, for example, based on and/or in response to a change in the UI screen that is currently being displayed by GUI 702. That is, each time a user navigates to a different UI screen by way of GUI 702, the prediction of the next UI screen may be updated. Refresh controller 604 may be configured to determine that GUI 702 switched from displaying one UI screen to displaying another UI screen based on, for example, a notification from network component 634 analogous to that at arrow 722.

Based on and/or in response to determining the next UI screen at block 750, refresh controller 604 may be configured to determine whether the next UI screen is stale. In the example of FIG. 7C, refresh controller is illustrated determining that the next UI screen is stale, as indicated by block 752. The next UI screen may be determined to be stale when it is indicated as stale by at least one stale set (e.g., that of the tab to which the next UI screen belongs).

Based on and/or in response to determining, at block 752, that the next UI screen is stale, refresh controller 604 may be configured to transmit, to network component 634, a request to pre-fetch an updated version of the next UI screen, as indicated by arrow 754. Based on and/or in response to reception of the request at arrow 754, network component 634 may be configured to transmit, to server application 700, a request/query for the updated version of the next UI screen, as indicated by arrow 756. Based on and/or in reception of the request/query at arrow 756, server application 700 may be configured to generate the updated version of the next UI screen, as indicated by block 758. The updated version of the next UI screen may be based on and/or may represent any modifications resulting from execution of the action at block 736 of FIG. 7B.

Based on and/or in response to generation of the updated version of the next UI screen, server application 700 may be configured to transmit, to network component 634, the updated version of the next UI screen, as indicated by arrow 760. Based on and/or in response to reception of the updated version of the next UI screen at arrow 760, network component 634 may be configured to store, in the memory of the client device, the updated version of the next UI screen, as indicated by block 762.

Based on and/or in response to reception and/or storage of the updated version of the next UI screen at arrow 760 and/or block 762, network component 634 may be configured to transmit, to refresh controller 604, an indication that the updated version of the next UI screen was obtained, as indicated by arrow 772. Based on and/or in response to reception of the indication at arrow 772, refresh controller 604 may be configured to update the stale set(s) based on the update to the next UI screen, as indicated by block 774. For example, refresh controller 604 may be configured to remove the next UI screen from the stale set(s) and/or modify the representation of the next UI screen in the stale set(s) to indicate that the next UI screen is no longer stale. Thus, the next UI screen might not be pre-fetched again until it is rendered stale by another modification performed by way of another UI screen.

GUI 702 may be configured to provide, to network component 634, a request for the next UI screen, as indicated by arrow 764. Based on and/or in response to reception of the request at arrow 764, network component 634 may be configured to provide, to GUI 702, the updated version of the next UI screen, as indicated by arrow 766. Based on and/or in response to reception of the updated version of the next UI screen at arrow 766, GUI 702 may be configured to display the updated version of the next UI screen, as indicated by block 768. Accordingly, GUI 702 may display a version of next UI screen that reflects the modification previously performed by the operations illustrated in FIG. 7B, rather than displaying a stale version of the next UI screen.

In the example shown in FIG. 7C, the request at arrow 764 is shown as being generated after block 762, however, in other implementations, the request at arrow 764 may be generated, for example, before arrow 760 or between arrow 760 and block 762. That is, GUI 702 may be used to request the next screen before the updated version thereof is obtained by network component 634. In such cases, pre-fetching of the updated version of the next UI component may nevertheless be beneficial because, although the updated version of the next UI screen may appear to take longer to load, GUI 702 may ultimately display the updated version of the next UI screen, rather than the stale version thereof.

The operations of block 750 through block 768 may be repeated, as indicated by arrow 770, to pre-fetch updated versions of one or more subsequent UI screens. Notably the pre-fetch of updated versions of the UI screens may be incremental in that software application 600 may request a refresh of, for example, one stale UI screen at a time, rather than all stale UI screens at once. Thus, expenditure of computational and/or communication resources on refreshing stale UI screens that do not end up being revisited may be reduced and/or eliminated.

Additionally, without the pre-fetching operations of FIG. 7C, GUI 702 might instead display stale versions of these subsequent UI screens. Although such subsequent screens could be refreshed based on and/or in response to a manual refresh request received by way of GUI 702, the user might not know whether a manual refresh is needed. Thus, the user might end up using the manual refresh when it is not needed, thereby wasting computing and/or communication resources, and/or might end up using the manual refresh insufficiently, thereby operating based on stale data.

VII. Example Operations

Figure 8:
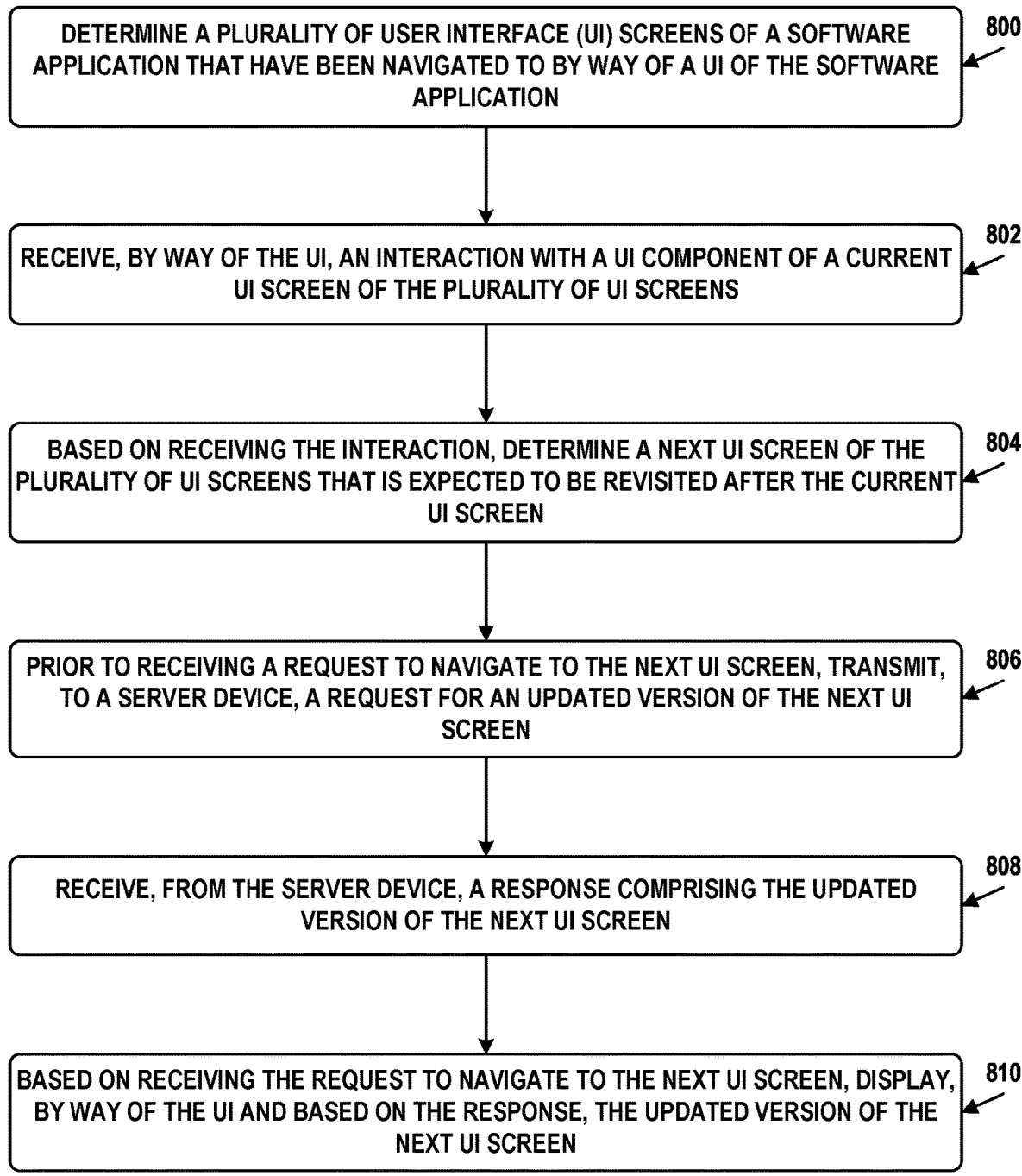
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device, and/or by software application 600.

The embodiments of FIG. 8 may be simplified by the removal of any one or more of the features shown therein. Further, these embodiments may be combined with features, aspects, and/or implementations of any of the previous figures or otherwise described herein.

Block 800 may include determining a plurality of UI screens of a software application that have been navigated to by way of a UI of the software application.

Block 802 may include receiving, by way of the UI, an interaction with a UI component of a current UI screen of the plurality of UI screens.

Block 804 may include, based on receiving the interaction, determining a next UI screen of the plurality of UI screens that is expected to be revisited after the current UI screen Block 806 may include, prior to receiving a request to navigate to the next UI screen, transmitting, to a server device, a query for an updated version of the next UI screen Block 808 may include receiving, from the server device, a response comprising the updated version of the next UI screen.

Block 810 may include, based on receiving the request to navigate to the next UI screen, displaying, by way of the UI and based on the response, the updated version of the next UI screen.

In some embodiments, the plurality of UI screens may have been received from the server device and may be stored in the memory. Based on the interaction, it may be determined that the memory contains a stale version of the next UI screen. The query for the updated version of the next UI screen may be transmitted to the server device based on determining that the memory contains the stale version of the next UI screen.

In some embodiments, the software application may include a plurality of groups of UI screens arranged into a plurality of tabs. The current UI screen and the next UI screen may form part of a first tab of the plurality of tabs. Determining the plurality of UI screens may include determining, for each respective tab of the plurality of tabs, a corresponding list of one or more UI screens that have been navigated to by way of the UI. Determining that the memory contains the stale version of the next UI screen may include marking, based on the interaction with the UI component of the current UI screen, each respective UI screen in the corresponding list of the first tab as stale, and determining that the next UI screen (i) is present in the corresponding list of the first tab and (ii) has been marked as stale.

In some embodiments, the software application may include a plurality of groups of UI screens arranged into a plurality of tabs. The current UI screen may form part of a first tab of the plurality of tabs and the next UI screen may form part of a second tab of the plurality of tabs. Determining the plurality of UI screens may include determining, for each respective tab of the plurality of tabs, a corresponding list of one or more UI screens that have been navigated to by way of the UI. Determining that the memory contains the stale version of the next UI screen may include marking, based on the interaction with the UI component of the current UI screen, each respective UI screen in the corresponding list of each respective tab of the plurality of tabs as stale, and determining that the next UI screen (i) is present in the corresponding list of the second tab and (ii) has been marked as stale.

In some embodiments, determining that the memory contains the stale version of the next UI screen may include obtaining a dependency map that indicates data dependencies shared by at least the current UI screen and the next UI screen, and determining, based on the dependency map, that a modification caused by the interaction caused a version of the next UI component stored in the memory to become stale.

In some embodiments, the interaction with the UI component may be configured to cause a modification to data displayed by the current UI screen.

In some embodiments, the interaction with the UI component may be configured to cause a modification to data displayed by the next UI screen. The updated version of the next UI screen may be based on the modification to the data.

In some embodiments, determining the plurality of UI screens may include determining an ordered list of the plurality of UI screens based on an order in which the plurality of UI screens have been navigated to by way of the UI. Determining the next UI screen may include selecting, from the ordered list, a UI screen that precedes the current UI screen within the ordered list.

In some embodiments, the software application may include a workflow model that defines an expected order in which UI screens of the software application are expected to be navigated to. Determining the next UI screen may include selecting the next UI screen based on the workflow model.

In some embodiments, determining the next UI screen may include selecting the next UI screen using a machine learning model that has been trained to determine UI screens that are expected to be revisited next by way of the UI based on one or more of: (i) the current UI screen, (ii) the UI component of the current UI screen, (iii) the plurality of UI screens, and/or (iv) a workflow model of the software application.

In some embodiments, based on displaying the updated version of the next UI screen, a subsequent UI screen of the plurality of UI screens that is expected to be revisited after the next UI screen may be determined. Prior to receiving a second request to navigate to the subsequent UI screen, a second query for an updated version of the subsequent UI screen may be transmitted to the server device. A second response that includes the updated version of the subsequent UI screen may be received from the server device. Based on receiving the second request to navigate to the subsequent UI screen, the updated version of the subsequent UI screen may be displayed by way of the UI and based on the second response.

In some embodiments, a subsequent UI screen of the plurality of UI screens that is expected to be revisited next may be determined. Prior to receiving a second request to navigate to the subsequent UI screen, instructions configured to cause the computing system to transmit, to the server device, a second query for an updated version of the subsequent UI screen may be generated. Prior to receiving, from the server device, a second response that includes the updated version of the subsequent UI screen, a third request to navigate to an intermediate UI screen may be received. Based on receiving the third request to navigate to the intermediate UI screen, the second query may be cancelled by deleting the instructions or transmitting, to the server device, a cancellation request corresponding to the second query.

In some embodiments, based on receiving the interaction, a second query for an updated version of the current UI screen may be transmitted to the server device. A second response that includes the updated version of the current UI screen may be received from the server device. Based on receiving the second response, the updated version of the current UI screen may be displayed by way of the UI and based on the second response.

In some embodiments, prior to receiving the request to navigate to the next UI screen, a second request to navigate to an intermediate UI screen may be received. Based on receiving the second request to navigate to the intermediate UI screen, a second query for the intermediate UI screen may be transmitted to the server device. A second response that includes the intermediate UI screen may be received from the server device. Based on receiving the second response, the intermediate UI screen may be displayed by way of the UI and based on the second response.

VIII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
 a processor;
 a memory; and
 a software application stored in the memory and configured to perform, when executed by the processor, operations comprising:
  determining a plurality of user interface (UI) screens of the software application that have been navigated to by way of a UI of the software application, wherein the plurality of UI screens have been received from a server device and are stored in the memory, wherein the software application comprises a plurality of groups of UI screens arranged into a plurality of tabs, and wherein determining the plurality of UI screens comprises determining, for each respective tab of the plurality of tabs, a corresponding list of one or more UI screens that have been navigated to by way of the UI;
  receiving, by way of the UI, an interaction with a UI component of a current UI screen of the plurality of UI screens;
  based on receiving the interaction, (i) marking as stale each respective UI screen in the corresponding list of a first tab of the plurality of tabs and (ii) determining a next UI screen of the plurality of UI screens that is expected to be revisited after the current UI screen, wherein the next UI screen forms part of the first tab;
  determining that the memory contains a stale version of the next UI screen;
  prior to receiving a request to navigate to the next UI screen and based on determining that the memory contains the stale version of the next UI screen, transmitting, to the server device, a query for an updated version of the next UI screen;
  receiving, from the server device, a response comprising the updated version of the next UI screen; and
  based on receiving the request to navigate to the next UI screen, displaying, by way of the UI and based on the response, the updated version of the next UI screen.

2. The computing system of claim 1, wherein:
the current UI screen forms part of the first tab; and
marking as stale each respective UI screen in the corresponding list of the first tab comprises marking as stale each respective UI screen in the corresponding list of the first tab without modifying a staleness of the corresponding one or more UI screens of other tabs of the plurality of tabs.

3. The computing system of claim 1, wherein:
the current UI screen forms part of a second tab of the plurality of tabs; and
marking as stale each respective UI screen in the corresponding list of the first tab comprises marking as stale each respective UI screen in the corresponding list of each respective tab of the plurality of tabs.

4. The computing system of claim 1, wherein determining that the memory contains the stale version of the next UI screen comprises:
determining that the next UI screen (i) is present in the corresponding list of the first tab and (ii) has been marked as stale.

5. The computing system of claim 1, wherein the interaction with the UI component is configured to cause a modification to data displayed by the current UI screen.

6. The computing system of claim 1, wherein the interaction with the UI component is configured to cause a modification to data displayed by the next UI screen, and wherein the updated version of the next UI screen is based on the modification to the data.

7. The computing system of claim 1, wherein:
the corresponding one or more UI screens of the first tab comprise a corresponding first plurality of UI screens;

determining the plurality of UI screens comprises determining, for the first tab, a first ordered list of the corresponding first plurality of UI screens based on an order in which UI screens of the corresponding first plurality of UI screens have been navigated to by way of the UI; and determining the next UI screen comprises selecting, from the first ordered list, a UI screen that precedes the current UI screen within the first ordered list.

8. The computing system of claim 1, wherein the software application comprises a workflow model that defines an expected order in which UI screens of the software application are expected to be navigated to, wherein determining the next UI screen comprises:

selecting the next UI screen based on the workflow model.

9. The computing system of claim 1, wherein determining the next UI screen comprises:

selecting the next UI screen using a machine learning model that has been trained to determine UI screens that are expected to be revisited next by way of the UI based on one or more of: (i) the current UI screen, (ii) the UI component of the current UI screen, (iii) the plurality of UI screens, or (iv) a workflow model of the software application.

10. The computing system of claim 1, wherein the operations further comprise:

based on displaying the updated version of the next UI screen, determining a subsequent UI screen of the plurality of UI screens that is expected to be revisited after the next UI screen;

prior to receiving a second request to navigate to the subsequent UI screen, transmitting, to the server device, a second query for an updated version of the subsequent UI screen;

receiving, from the server device, a second response comprising the updated version of the subsequent UI screen; and based on receiving the second request to navigate to the subsequent UI screen, displaying, by way of the UI and based on the second response, the updated version of the subsequent UI screen.

11. The computing system of claim 1, further comprising:

determining a subsequent UI screen of the plurality of UI screens that is expected to be revisited next;

prior to receiving a second request to navigate to the subsequent UI screen, generating instructions configured to cause the computing system to transmit, to the server device, a second query for an updated version of the subsequent UI screen;

prior to receiving, from the server device, a second response comprising the updated version of the subsequent UI screen, receiving a third request to navigate to an intermediate UI screen; and based on receiving the third request to navigate to the intermediate UI screen, cancelling the second query by deleting the instructions or transmitting, to the server device, a cancellation request corresponding to the second query.

12. The computing system of claim 1, wherein the operations further comprise:

based on receiving the interaction, transmitting, to the server device, a second query for an updated version of the current UI screen;

receiving, from the server device, a second response comprising the updated version of the current UI screen; and based on receiving the second response, displaying, by way of the UI and based on the second response, the updated version of the current UI screen.

13. The computing system of claim 1, wherein the operations further comprise:

prior to receiving the request to navigate to the next UI screen, receiving a second request to navigate to an intermediate UI screen;

based on receiving the second request to navigate to the intermediate UI screen, transmitting, to the server device, a second query for the intermediate UI screen;

receiving, from the server device, a second response comprising the intermediate UI screen; and based on receiving the second response, displaying, by way of the UI and based on the second response, the intermediate UI screen.

14. A computer-implemented method comprising:

determining a plurality of user interface (UI) screens of a software application that have been navigated to by way of a UI of the software application, wherein the plurality of UI screens have been received from a server device and are stored in memory, wherein the software application comprises a plurality of groups of UI screens arranged into a plurality of tabs, and wherein determining the plurality of UI screens comprises determining, for each respective tab of the plurality of tabs, a corresponding list of one or more UI screens that have been navigated to by way of the UI;

receiving, by way of the UI, an interaction with a UI component of a current UI screen of the plurality of UI screens;

based on receiving the interaction, (i) marking as stale each respective UI screen in the corresponding list of a first tab of the plurality of tabs and (ii) determining a next UI screen of the plurality of UI screens that is expected to be revisited after the current UI screen, wherein the next UI screen forms part of the first tab;

determining that the memory contains a stale version of the next UI screen;

prior to receiving a request to navigate to the next UI screen and based on determining that the memory contains the stale version of the next UI screen, transmitting, to the server device, a query for an updated version of the next UI screen;

receiving, from the server device, a response comprising the updated version of the next UI screen; and based on receiving the request to navigate to the next UI screen, displaying, by way of the UI and based on the response, the updated version of the next UI screen.

15. The computer-implemented method of claim 14, wherein:

the current UI screen forms part of the first tab; and marking as stale each respective UI screen in the corresponding list of the first tab comprises marking as stale each respective UI screen in the corresponding list of the first tab without modifying a staleness of the corresponding one or more UI screens of other tabs of the plurality of tabs.

16. The computer-implemented method of claim 14, wherein:

the current UI screen forms part of a second tab of the plurality of tabs; and marking as stale each respective UI screen in the corresponding list of the first tab comprises marking as stale each respective UI screen in the corresponding list of each respective tab of the plurality of tabs.

17. The computer-implemented method of claim 14, wherein:
- the corresponding one or more UI screens of the first tab comprise a corresponding first plurality of UI screens;
- determining the plurality of UI screens comprises determining, for the first tab, a first ordered list of the corresponding first plurality of UI screens based on an order in which UI screens of the corresponding first plurality of UI screens have been navigated to by way of the UI; and
- determining the next UI screen comprises selecting, from the first ordered list, a UI screen that precedes the current UI screen within the first ordered list.

18. A non-transitory computer-readable medium, having stored thereon program instructions that, upon execution by a computing system, cause the computing system to perform operations comprising:
- determining a plurality of user interface (UI) screens of a software application that have been navigated to by way of a UI of the software application, wherein the plurality of UI screens have been received from a server device and are stored in a memory, wherein the software application comprises a plurality of groups of UI screens arranged into a plurality of tabs, and wherein determining the plurality of UI screens comprises determining, for each respective tab of the plurality of tabs, a corresponding list of one or more UI screens that have been navigated to by way of the UI;
- receiving, by way of the UI, an interaction with a UI component of a current UI screen of the plurality of UI screens;
- based on receiving the interaction, (i) marking as stale each respective UI screen in the corresponding list of a first tab of the plurality of tabs and (ii) determining a next UI screen of the plurality of UI screens that is expected to be revisited after the current UI screen, wherein the next UI screen forms part of the first tab;
- determining that the memory contains a stale version of the next UI screen;
- prior to receiving a request to navigate to the next UI screen and based on determining that the memory contains the stale version of the next UI screen, transmitting, to the server device, a query for an updated version of the next UI screen;
- receiving, from the server device, a response comprising the updated version of the next UI screen; and
- based on receiving the request to navigate to the next UI screen, displaying, by way of the UI and based on the response, the updated version of the next UI screen.

19. The non-transitory computer-readable medium of claim 18, wherein:
- the current UI screen forms part of the first tab; and
- marking as stale each respective UI screen in the corresponding list of the first tab comprises marking as stale each respective UI screen in the corresponding list of the first tab without modifying a staleness of the corresponding one or more UI screens of other tabs of the plurality of tabs.

20. The non-transitory computer-readable medium of claim 18, wherein:
- the current UI screen forms part of a second tab of the plurality of tabs; and
- marking as stale each respective UI screen in the corresponding list of the first tab comprises marking as stale each respective UI screen in the corresponding list of each respective tab of the plurality of tabs.

* * * * *